(12) United States Patent
Yamamoto (10) Patent No.: US 6,404,514 B1
(45) Date of Patent: Jun. 11, 2002

(54) IMAGE READING SYSTEM AND IMAGE READING DEVICE

(75) Inventor: Yasuhiro Yamamoto, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,547

(22) Filed: Dec. 21, 1998

(30) Foreign Application Priority Data

Dec. 22, 1997 (JP) .............................. 9-364738

(51) Int. Cl.[7] ................................. H04N 1/40
(52) U.S. Cl. ...................... 358/442; 358/474
(58) Field of Search .......................... 358/462, 467, 358/400, 407, 448, 442, 444, 471, 473, 474

(56) References Cited

U.S. PATENT DOCUMENTS 5,506,692 A * 4/1996 Murata ....................... 358/442
5,508,821 A * 4/1996 Murata ....................... 358/442
5,949,555 A * 9/1999 Sakai et al. ................. 358/462
6,032,864 A * 3/2000 Hamasuna ............. 235/462.25
6,111,659 A * 8/2000 Murata ....................... 358/296

* cited by examiner

*Primary Examiner*—Jerome Grant, II
(74) *Attorney, Agent, or Firm*—Greenblum & Bernstein, P.L.C.

(57) ABSTRACT

The image reading system comprises an image reading device and a computer, which is connected to the image reading device. The image reading device has a line sensor by which an image recorded in a read object is read. Image data corresponding to the image is recorded in a recording medium by the image reading device. In the image reading device, only an operation mode, such as a reading operation, in which the image is read, a recording operation, in which the image data is recorded in the recording medium, and a deleting operation, in which the image data is deleted from the recording medium, can be performed. An operating condition, such as a resolution with which the image is indicated by a display device, can only be changed by the computer.

13 Claims, 11 Drawing Sheets

IMAGE READING SYSTEM AND IMAGE READING DEVICE

BACKGROUND OF THE INVENTION

1. Field of the Invention

The present invention relates to an image reading system in which an image, recorded in a film, for example, is read by a line sensor, and more particularly to an improvement of an operation for setting a reading condition, in accordance with which a reading operation is performed.

2. Description of the Related Art

Conventionally, such an image reading device can be controlled by a host computer provided externally and connected to the image reading device. Namely, a reading operation, in which an image is read by a line sensor, and a recording operation, in which image data obtained by the reading operation is recorded in a recording medium mounted in the image reading device, can be controlled by the host computer. On the other hand, in a stand-alone mode of the image reading device, i.e. independently of the host computer, the image can be read or the image data can be recorded in the recording medium by operating a switch provided on the image reading device.

In a remote mode in which the image reading device is controlled by the host computer, various kinds of operations can be performed by operating a mouse while observing a screen of a monitor connected to the host computer. Conversely, in the stand-alone mode, it is necessary that items, such as a date and a resolution of an image, can be changed by operating a console unit while indicating the items on a display device, such as a liquid crystal display. Thus, if the image reading device is constructed in such a manner that, in the standalone mode, all of the items can be changed by operating the console unit, the manipulation of the console unit becomes laborious and complicated.

SUMMARY OF THE INVENTION

Therefore, an object of the present invention is to provide an image reading system and device in which operations in the stand-alone mode are simplified.

According to the present invention, there is provided an image reading system having an operation mode which operates in accordance with an operating condition, the image reading system comprising an image reading device, a control circuit and a connectable device.

The image reading device performs a reading operation by which an image recorded in a read object is read. The control circuit is disposed in the image reading device, and controls the image reading device in accordance with the operating condition. The connectable device is connectable to the image reading device. The operating condition is settable by the connectable device.

Further, according to the present invention, there is provided an image reading device attachable to a connectable device, the image reading device performing a reading operation in which an image, recorded in a read object, is read, and a recording operation in which image data corresponding to the image is recorded to a recording medium. The reading and recording operations are performable independently of the connectable device. The image reading device comprises a connecting terminal, a memory and a control processor.

The connectable device is connected to the connecting terminal, so that data is transmittable between the image reading device and the connectable device. The memory stores operation condition data, which is used in the reading and recording operations. The control processor controls the reading and recording operations in accordance with the operation condition data, and stores the operation condition data when the operation condition data is inputted from the connectable device through the connecting terminal.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
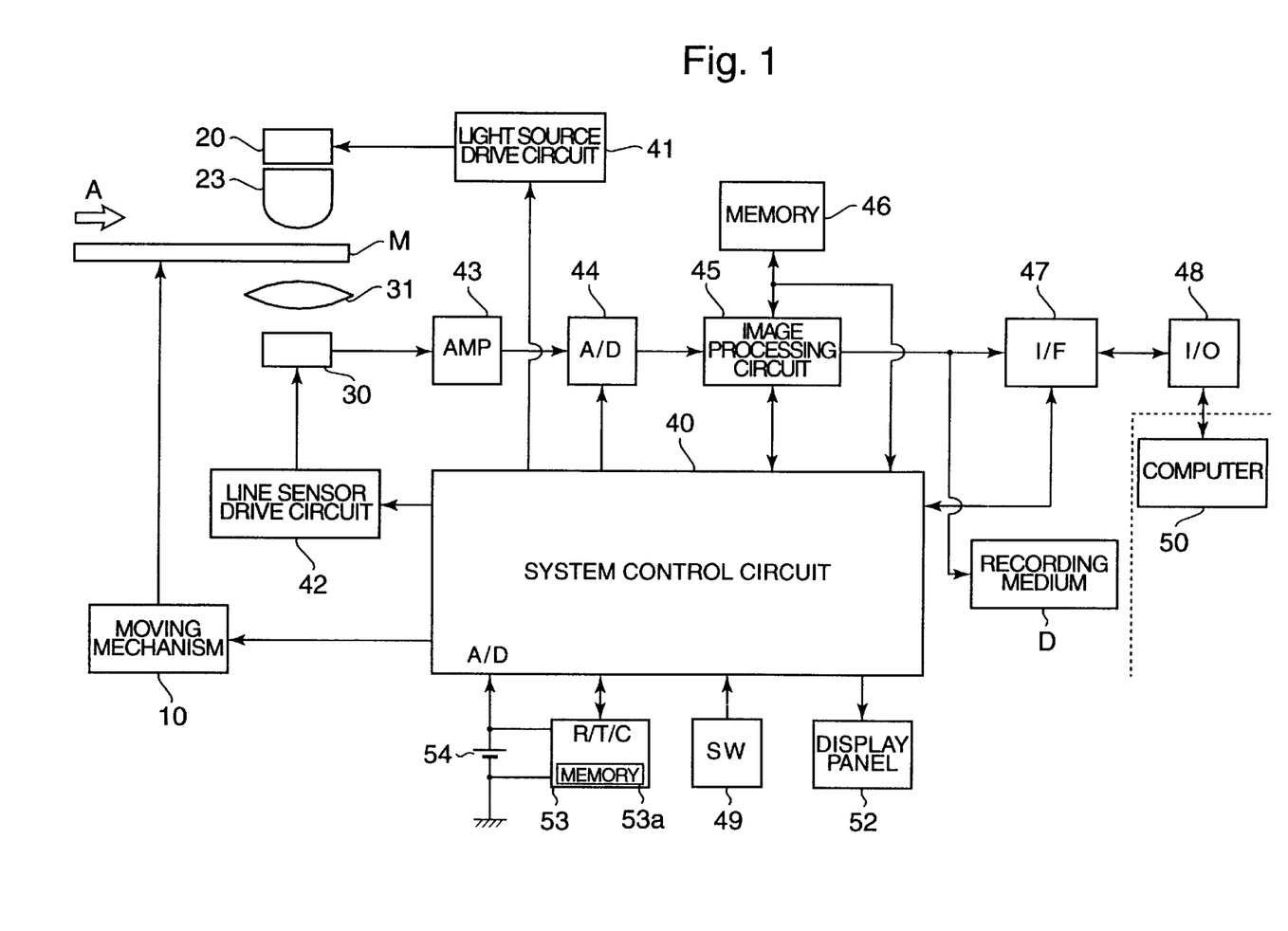
FIG. 1 is a block diagram showing an image reading device of an embodiment of the present invention.

FIG. 1 shows an image reading system of an embodiment of the present invention.

A read object M handled by this image reading device is a transparent negative film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photodiodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital image data are subjected to an image process, such as a shading correction, in an image processing circuit 45, and are then stored in a memory 46.

The digital image data, subsequent to being read from the memory 46, are subjected to various correction processes, such as a color correction and a gamma correction. The corrected digital image data can be recorded in a recording medium D. Further, the corrected digital image data are converted to a signal, which conforms to a predetermined format, by an interface circuit 47, and are outputted through an input/output terminal 48 to a computer 50, which is a connectable device provided externally and connectable to the image reading device.

Thus, the image reading device and the computer 50 can communicate with each other through the interface circuit 47 and the input/output terminal 48, so that various data can be transmitted between the image reading device and the computer 50. The A/D converter 44, the image processing circuit 45, the interface circuit 47, and a recording operation of the recording medium D are controlled by the system control circuit 40.

Besides the circuits described above, an operation switch 49, a display panel 52 and a real time clock 53 are connected to the system control circuit 40. The display panel 52 is provided for indicating various kinds of conditions regarding operations of the image reading device. The real time clock 53 is provided for recording a date and a time in the recording medium D. A back-up battery 54 is connected to the real time clock 53.

A reading operation, in which an image is read by the line sensor 30, and a recording operation, in which image data corresponding to the image is recorded in the recording medium D, can be performed in a remote mode carried out through the computer 50, or in the stand-alone mode, executed by operating the operation switch 49 connected to the system control circuit 40. In the stand-alone mode, the reading and recording operations are controlled by the system control circuit 40, independently of the computer 50. Note that the selection between the remote mode and the stand-alone mode is performed by depressing a mode change switch 49a (FIG. 4), which is described later.

On the other hand, regarding operating conditions relating to the reading operation, an operating condition, such as a thinning or an interpolation mode of the image data, is set by the computer 50 in the remote mode. The operating condition is set or determined in accordance with data stored in a non-volatile storage (EEPROM) or memory 53a provided in the real time clock 53, in the stand-alone mode. The data stored in the memory 53a represent preset default values, and can be changed by the computer 50 through, for example, operating a mouse. The altered data can be then recorded to the memory 53a when the computer 50 is connected to the image reading device.

The image reading system can perform the reading operation, the recording operation, and a deleting operation, in which the image data recorded in the recording medium D is deleted. The operation modes, including the reading operation, the recording operation and the deleting operation, are carried out more frequently than the operating conditions need to be changed. In this embodiment, although the operation modes can be initiated and performed both in the remote mode and in the stand-alone mode, the operating conditions can only be changed by the computer 50.

Figure 2:
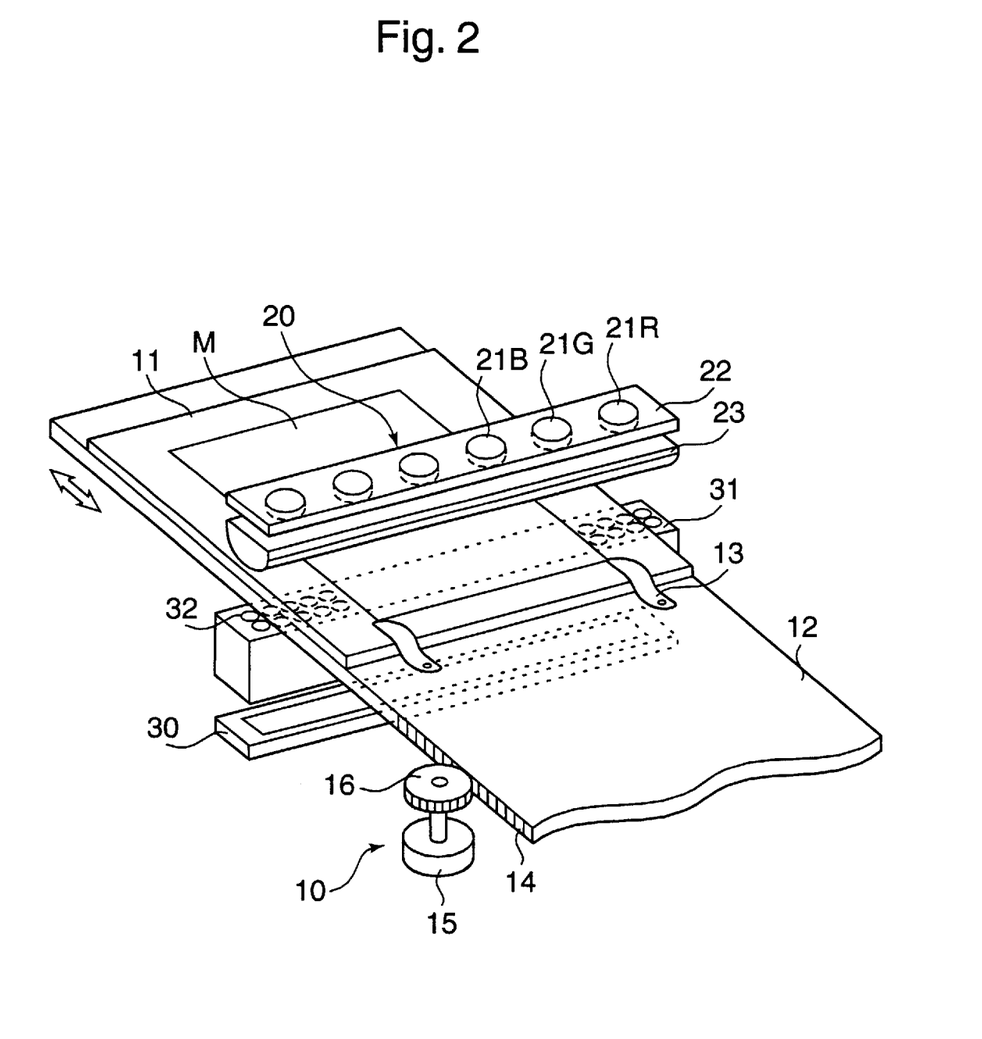
FIG. 2 is a perspective view showing a moving mechanism, a light source and a line sensor, when a transparent film is used.

FIG. 2 shows the moving mechanism 10, the light source 20 and the line sensor 30. The film M is supported by a frame 11, which is fixed on a plate stage 12 by at least one fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position of the film M is controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. This order can be changed in accordance with necessity.

The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
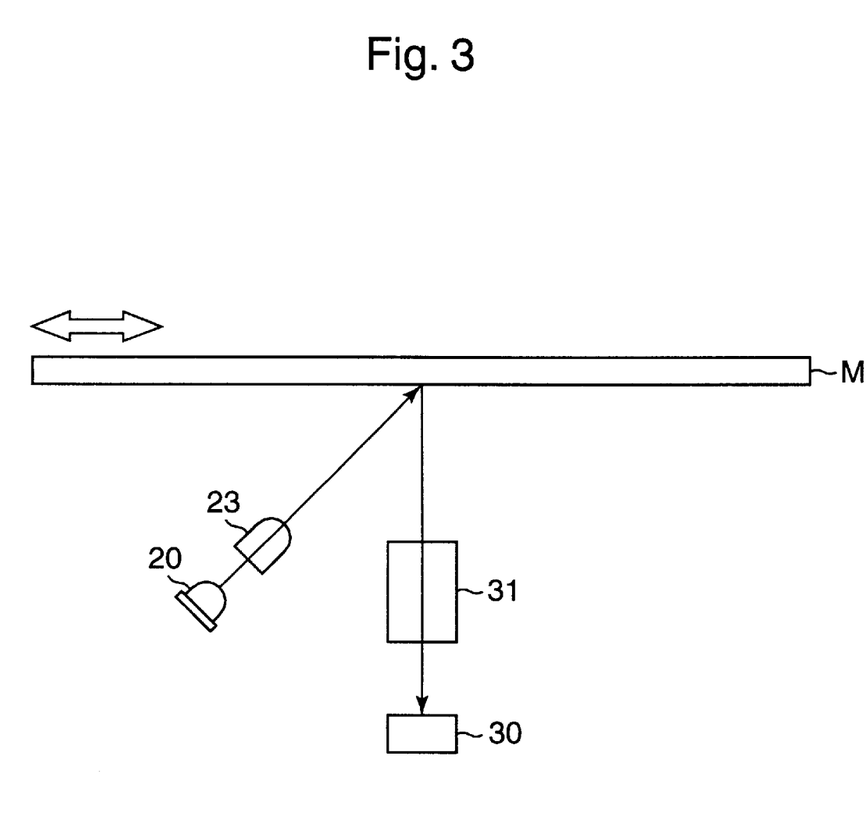
FIG. 3 is a view showing a structure, including a light source and a line sensor, used for reading an image recorded on a read object from which a light beam is reflected.

FIG. 3 shows an alternative structure, that includes the light source 20 and the line sensor 30, used for reading an image recorded on the read object M from which a light beam is reflected. In this structure, the light source 20, the cylindrical lens 23, the line sensor 30 and the forming lens 31 are disposed under the read object M. Namely, a light beam outputted from the light source 20 irradiates the lower surface of the read object M, so that the light beam reflected by the read object M enters the line sensor 30 through the forming lens 31.

Figure 4:
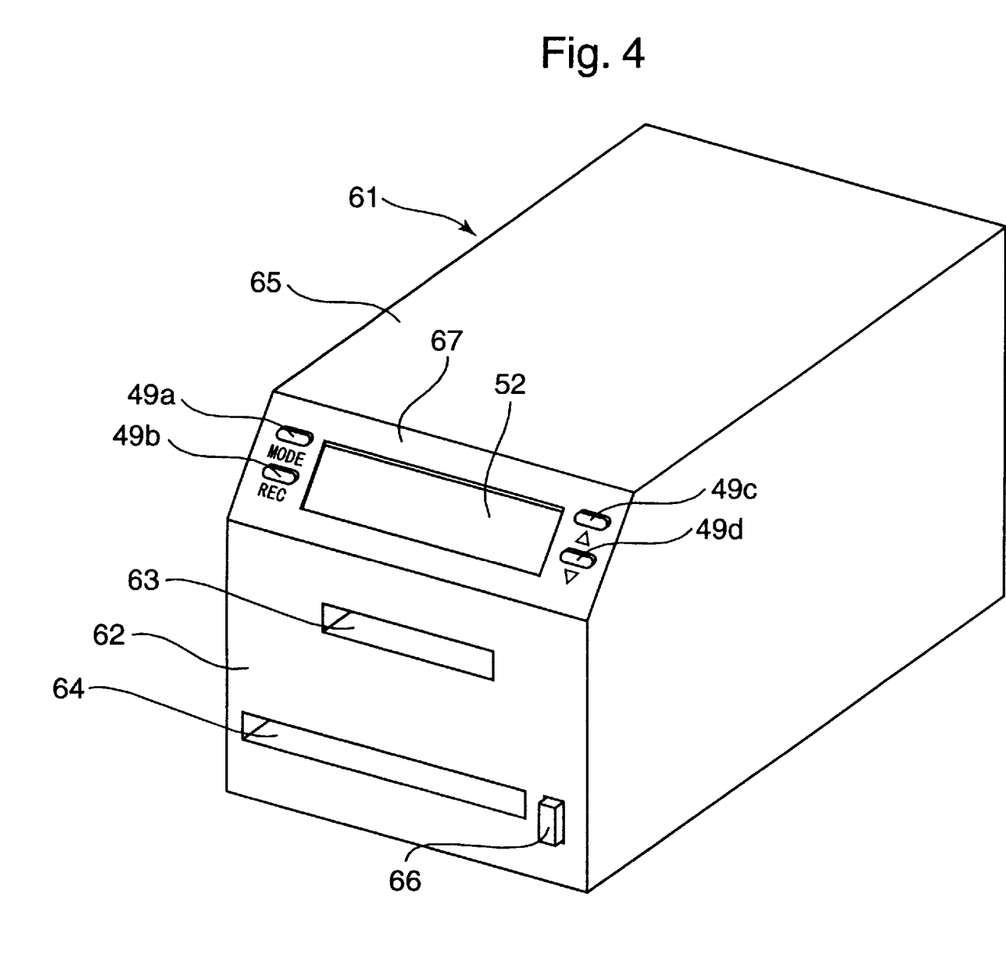
FIG. 4 is a perspective front-side view of the image reading device.

FIG. 4 is a perspective front-side view of the image reading device. A front surface 62 of a housing 61 is provided with a film inlet mouth 63, through which the film M (FIG. 1) is mounted on the stage 12 (FIG. 2), and a recording medium inlet mouth 64, through which the recording medium R is inserted in the housing 61. The film inlet mouth 63 and the recording medium inlet mouth 64 are parallel to an upper surface 65 of the housing 61. An eject button 66 is provided beside the recording medium inlet mouth 64, to remove the recording medium R from the housing 61 by depressing the eject button 66.

On a slant surface 67 formed between the upper surface 65 and the front surface 62, the display panel 52 (FIG. 1) is disposed. The mode change switch 49a, a record switch 49b, an up-switch 49c and a down-switch 49d are provided on opposite sides of the display panel 52. These switches 49a, 49b, 49c and 49d correspond to the switch 49 shown in FIG. 1.

Figure 5:
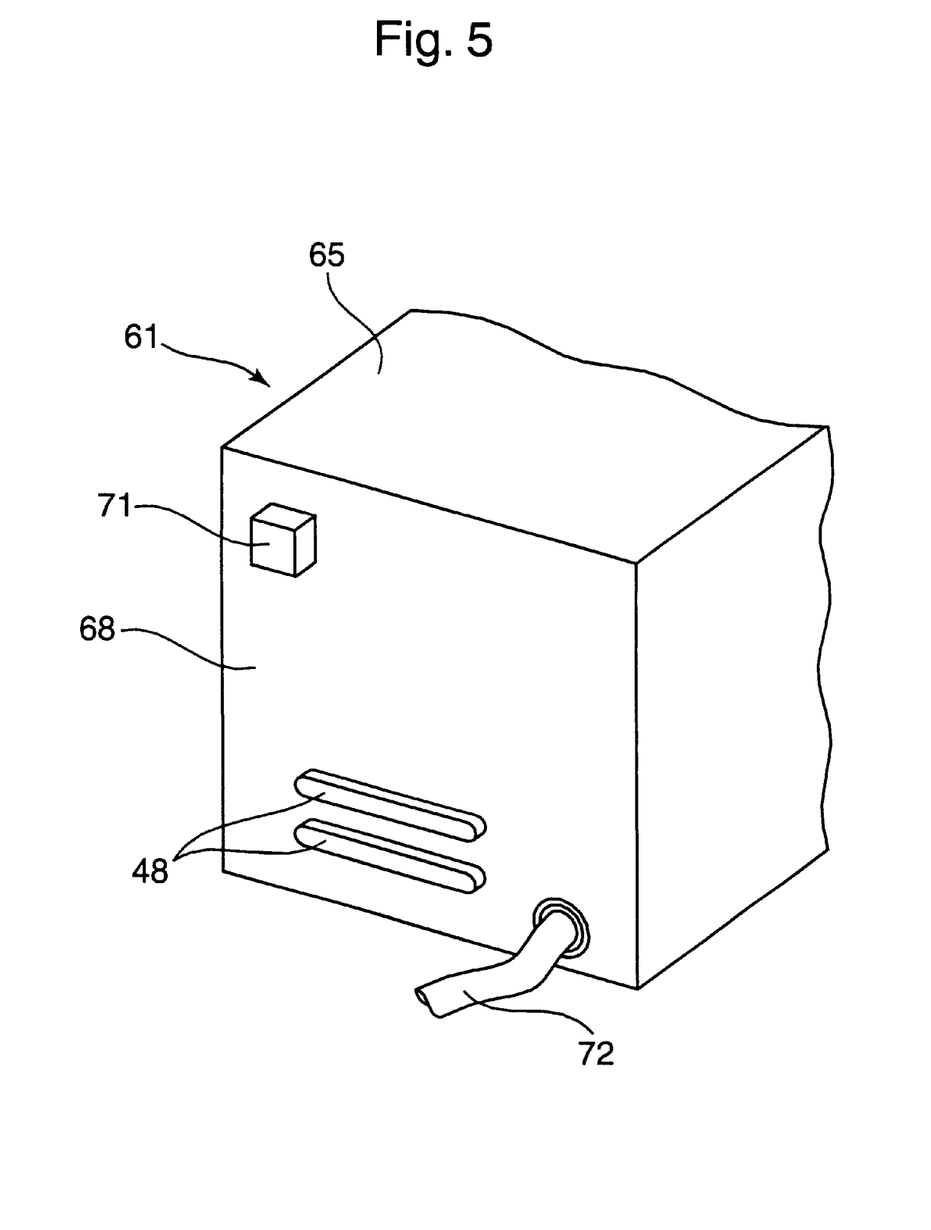
FIG. 5 is a perspective rear-side view of the image reading device.

FIG. 5 is a perspective rear-side view of the image reading device. An electric power switch 71 is disposed on an upper portion of a rear surface 68 of the housing 61, and an electric power cable 72 is provided on a lower portion of the rear surface 68. An input/output terminal 48 (FIG. 1 also) is provided close to the electric power cable 72.

Figure 6:
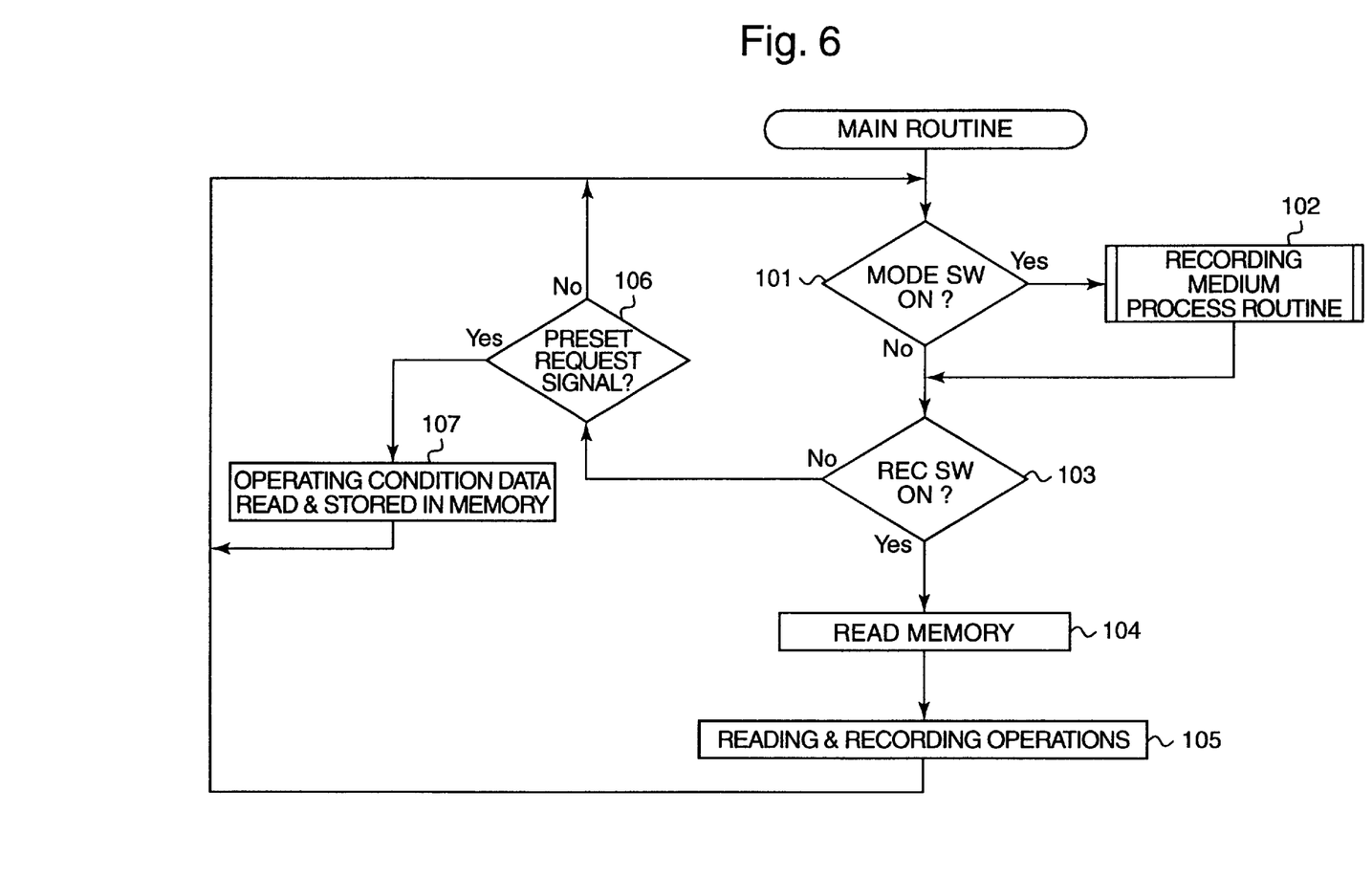
FIG. 6 is a flowchart of a main routine by which an operation of the image reading device is controlled.

FIG. 6 is a flowchart of a main routine by which an operation of the image reading device is controlled. The main routine is executed by the system control circuit 40, and is started by turning ON the electric power switch 71 of the image reading device.

Figure 7:
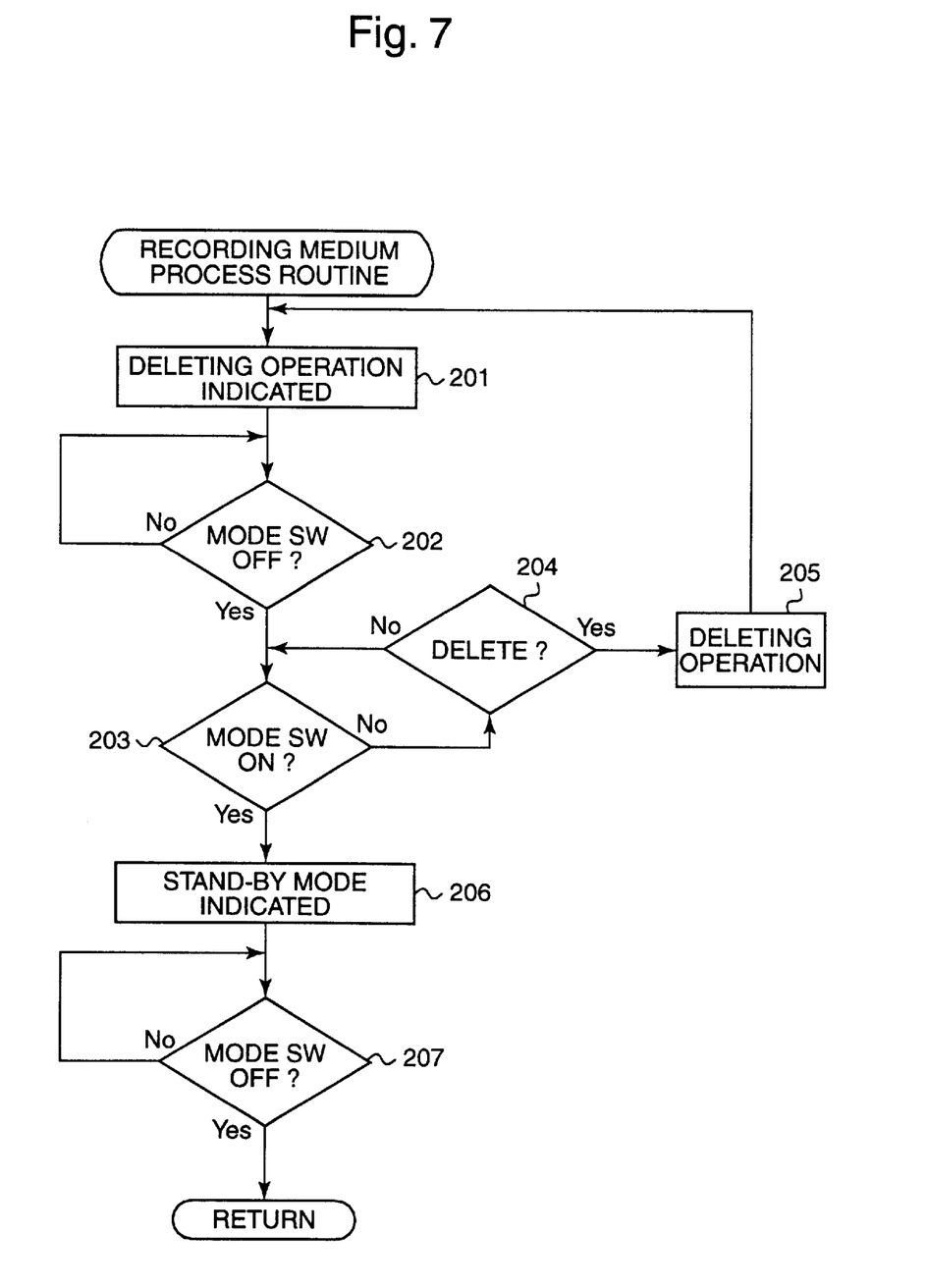
FIG. 7 is a flowchart of the recording medium process routine, executed in Step 102 shown in FIG. 6.

In Step 101, it is determined whether the mode change switch 49a (FIG. 4) is depressed, thus setting an ON state. When the mode change switch 49a is depressed, Step 102 is executed in which a recording medium process routine shown in FIG. 7 is executed. In the recording medium process routine, image data recorded in the recording medium D can be deleted.

When it is determined in Step 101 that the mode change switch 49a is not depressed, or after Step 102 is executed, Step 103 is executed, in which it is determined whether the record switch 49b (FIG. 4) is depressed. When the record switch 49b is depressed, the process goes to Step 104, in which operating condition data, stored in the memory 53a provided in the real time clock 53 (FIG. 1), is read. The operating condition data corresponds to an operating condition by which the reading, recording or deleting operation is performed. The operating condition is related to a thinning or an interpolation that should be performed on image data obtained by the reading operation, for example. Operating condition data corresponding to all operating conditions of the reading, recording and deleting operations are prestored in the memory 53a prior to initiation of the main routine.

In Step 105, the image is read by the line sensor 30, and image data corresponding to the image is recorded in the recording medium D. After this recording operation, the process returns to Step 101, and thus, the operations described above are again executed.

Conversely, when it is determined in Step 103 that the record switch 49b is not depressed, Step 106 is executed, in which it is determined whether a command signal (i.e. a preset request signal), implying that a new operating condition data is to be stored in the memory 53a, is outputted by the computer 50 (FIG. 1). When the preset request signal is outputted by the computer 50, Step 107 is executed in which the operating condition data, which is set in the computer 50 and corresponds to a new operating condition, is read and stored in the memory 53a. The new operating condition is set by operating a mouse while observing a surface of the display device connected to the computer 50, and the preset request signal is outputted in accordance with an operation of the mouse.

When it is determined in Step 106 that the preset request signal is not to be outputted, or after Step 107 is executed, the process returns to Step 101. Namely, by operating the mode change switch 49a and the record switch 49b, the reading operation, performed in accordance with the operating conditions of the reading operation defined by the operating condition data stored in the memory 53a, and the recording operation are both carried out.

FIG. 7 is a flowchart of the recording medium process routine executed in Step 102 shown in FIG. 6. In the recording medium process routine, although a deleting operation can be carried out as described hereinafter, the routine may be constructed in such a manner that the recording medium D can be formatted, for example.

In Step 201, an indication, implying that a deleting operation is set, is indicated by the display panel 52. When it is confirmed in Step 202 that the mode change switch 49a is turned OFF, Step 203 is executed, in which it is determined whether the mode change switch 49a is depressed. When it is determined that the mode change switch 49a is not depressed, Step 204 is executed. In Step 204, image data, which is to be deleted from the recording medium D, is designated by operating the up-switch 49c or the down switch 49d, and it is determined whether the record switch 49b is depressed so as to delete the selected image data.

When the record switch 49b has been depressed, confirming that the deleting operation should be carried out, the deleting operation is performed in Step 205, and the process then returns to Step 201. Conversely, when the deleting operation is not to be performed, Steps 203 and 204 are repeatedly executed.

When the mode change switch 49a is depressed while Steps 203 and 204 are repeatedly executed, the process goes from Step 203 to Step 206, in which an indication, implying that a stand-by mode is set, i.e. that an image reading operation can be performed, is indicated by the display panel 52. Then, when it is confirmed in Step 207 that the mode change switch 49a is released or turned OFF, the recording medium process routine ends.

As understood from the flowcharts shown in FIGS. 6 and 7, the operations, which can be carried out by the system control circuit 40 in the image reading device, independently from the computer 50, are only the image reading operation, the recording operation and the deleting operation. The other operations, by which the operating conditions of the operation modes, such as the image reading operation, are changed, are carried out by the computer 50. Namely, the operating conditions can be changed only when the computer 50 is connected to the image reading device.

With reference to FIGS. 8 through 12, a setting operation of the operating conditions performed by the computer 50 is described.

Figure 8:
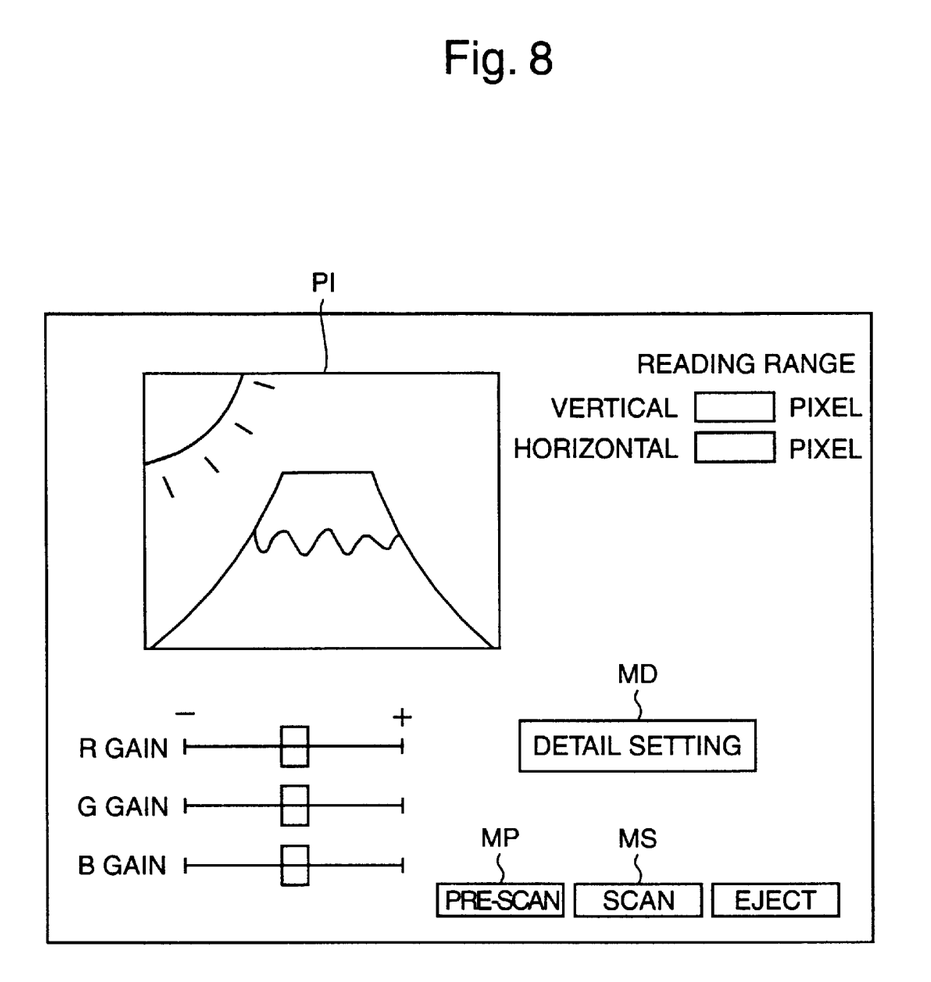
FIG. 8 is a view showing an example of a surface of a display device connected to a computer.

FIG. 8 shows an example of a surface of the display device connected to the computer 50.

For example, when a "PRE-SCAN" mark MP is clicked using a mouse, a pre-scanning operation is carried out, in which the read object M is scanned with a relatively coarse pitch by the line sensor 30, and thus an image PI obtained by the pre-scanning operation is indicated on a part of the surface. Conversely, when a "SCAN" mark MS is clicked, a regular scanning operation is performed, in which the read object M is scanned with a relatively fine pitch by the line sensor 30. An image obtained by the regular scanning operation is indicated on the whole of the surface.

Figure 9:
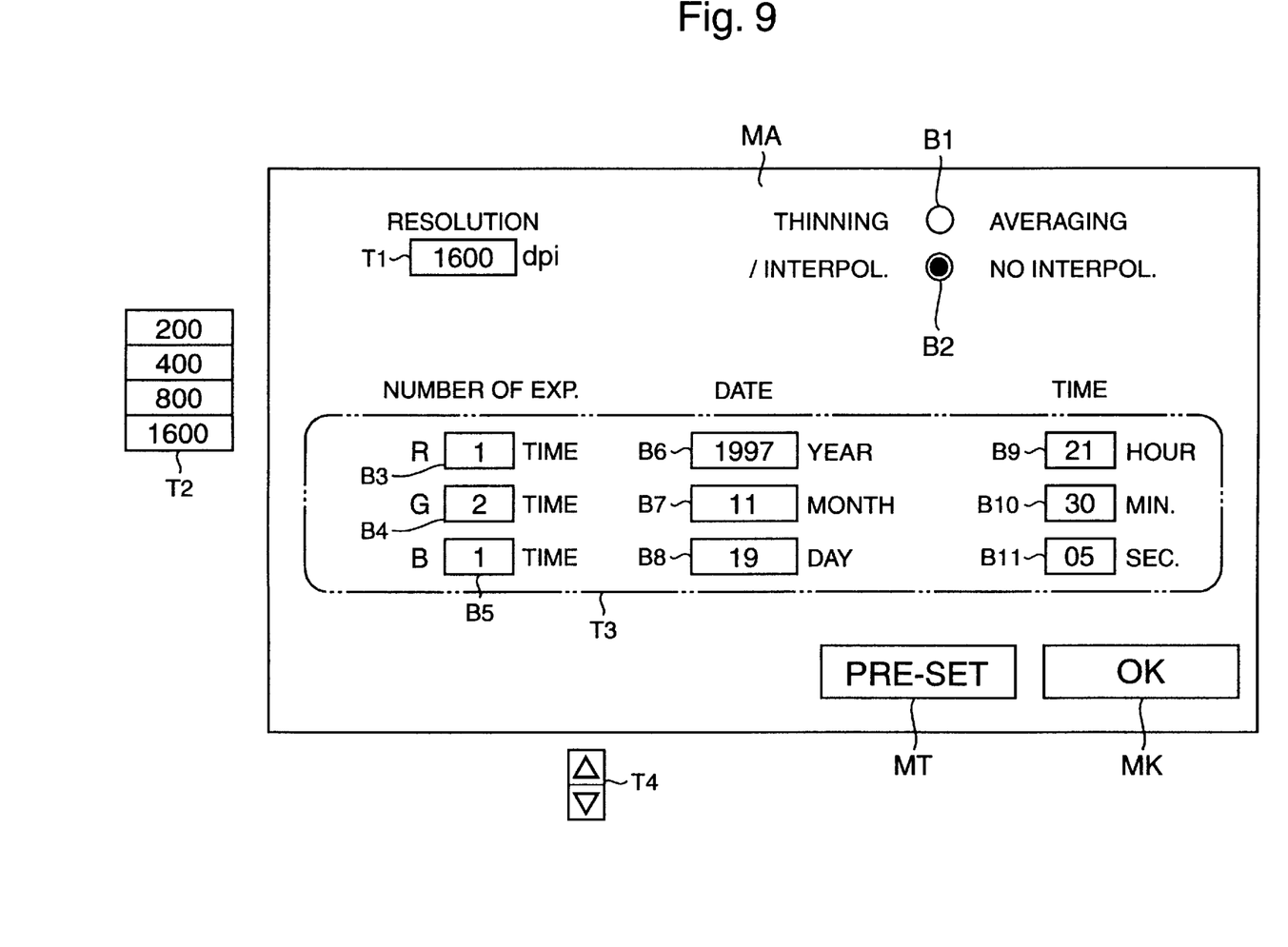
FIG. 9 is a view showing a menu image of a detail setting screen.

When a "DETAIL SETTING" mark MD is clicked, a menu image of a detail setting screen shown in FIG. 9 is indicated on the surface. In the menu image of the detail setting screen, an operating conditions selection can be performed under "RESOLUTION" and "THINNING/INTERPOLATION", and a number can be changed under each of "NUMBER OF EXPOSURE", "DATE" and "TIME". After setting these items, by clicking a "PRE-SET" mark MT, data set by this operation are transmitted to the memory 53a of the real time clock 53 provided in the image reading device, and stored therein. Conversely, when an "OK" mark MK is clicked without clicking the "PRE-SET"

mark MT after setting each of the items, the data set by the operation are not transmitted to the image reading device, and only come into effect in the remote mode. Namely, when the remote mode is selected, reading and recording operations are carried out in accordance with the newly set operating conditions.

A resolution setting indicated under "RESOLUTION" is carried out by clicking the inside of a frame Ti in which a resolution value is indicated. When clicking the inside of the frame T1, a selection menu T2 is indicated beside the frame T1. As shown in the selection menu T2, four kinds of resolutions, which are "1600", "800", "400" and "200", can be set.

Figure 10:
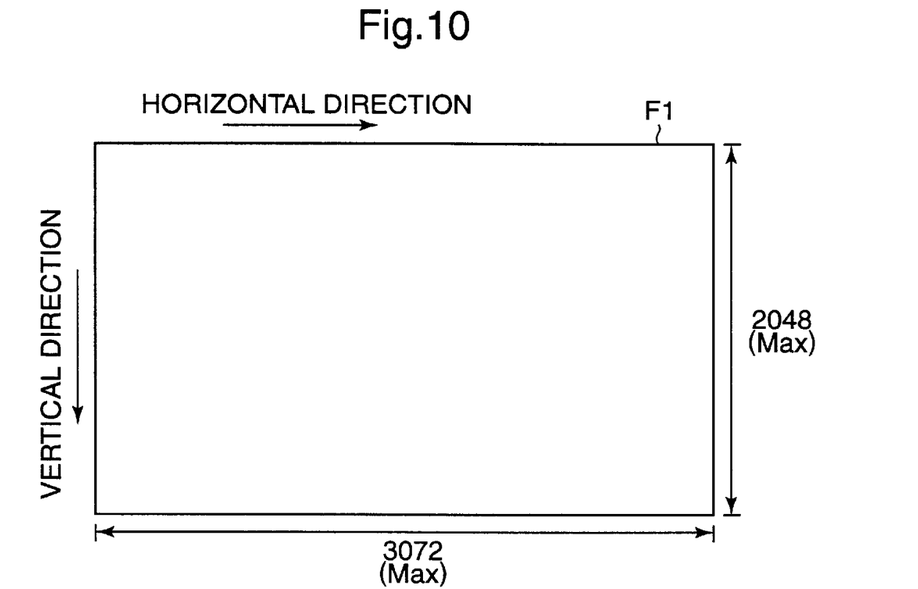
FIG. 10 is a view for explaining a resolution setting.

With reference to FIG. 10, the resolution setting is described. In this drawing, reference F1 shows an outer periphery of a screen of the display device connected to the computer 50, or an outer periphery of an image to be recorded to the recording medium D. The vertical direction corresponds to the longitudinal direction of the line sensor 30, and the horizontal direction corresponds to a moving direction A (see FIG. 1) of the read object M. The maximum number of pixels of the image F1 is 2048 in the vertical direction and 3072 in the horizontal direction.

The number of pixels in each of the vertical direction and the horizontal direction in each of the resolutions are as follows. For example, when the resolution is "800", the image to be indicated on the surface of the display or recorded to the recording medium D has a half of the pixels aligned in the vertical direction thinned, and a half of pixels aligned in the horizontal direction thinned when read.

1600: 2048×3072 pixels
800: 1024×1536 pixels
400: 512×768 pixels
200: 256×384 pixels Referring to FIG. 9, when an "AVERAGING" button B1 or a "NO INTERPOLATION" button B2, which are indicated beside the "THINNING/INTERPOLATION" characters MA, is clicked so that the button B1 or B2 is set to black (the button B2 is black in FIG. 9), one of the "AVERAGING" or "NO INTERPOLATION" operating conditions is selected.

Figure 11:
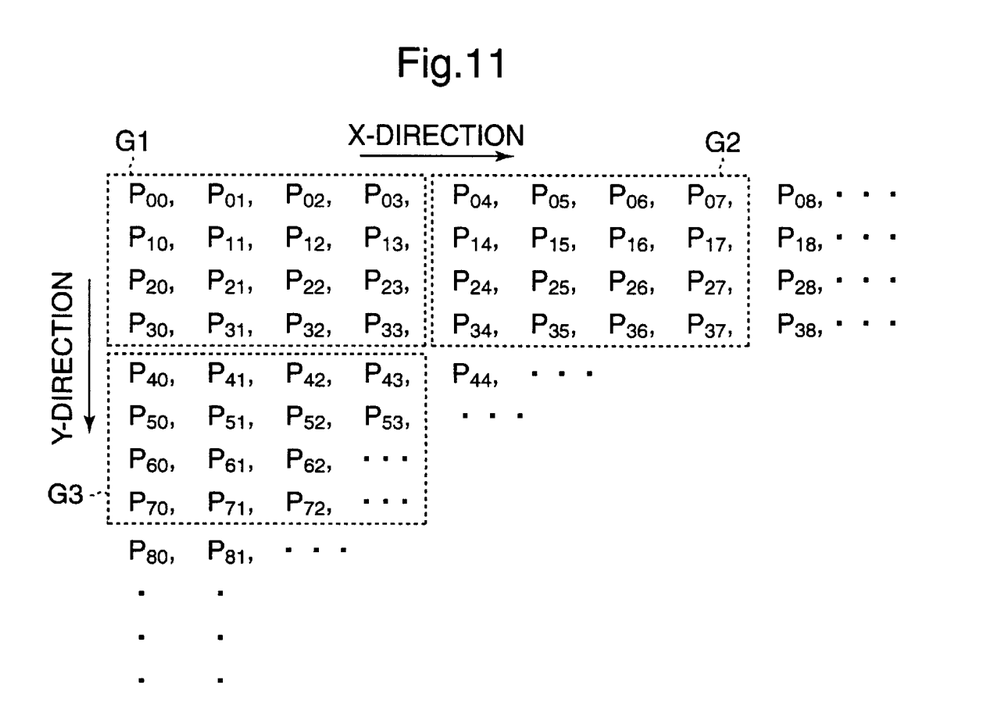
FIG. 11 is a view for explaining a thinning/interpolation in each of the resolutions.

With reference to FIG. 11, the thinning/interpolation operating conditions in each of the resolutions is described. An X-direction corresponds to the vertical direction of FIG. 10, and pixels P00, P01, P02 . . . are data of one line simultaneously read by the line sensor 50. For example, when the resolution "400" and the "NO INTERPOLATION" operating conditions are selected, in each 4×4 matrix, containing 16 pixels, enclosed by broken lines G1, G2 and G3 in FIG. 11, upper and left pixels P00, P04, P08, . . . P40, P44, P48, are selected, and the other pixels are neglected. On the other hand, when resolution "400" and the "AVERAGING" operating conditions are selected, an averaging or an arithmetic mean value of the 16 pixels forming each 4×4 matrix is adopted as one pixel data. For example, regarding 16 pixels shown by reference G1, one averaged pixel data is obtained by (P00+P01+P02+P03+P10+P11+P12+P13+P20+P21+P22+P23+P30+P31+P32+P33)/16. Thus, the processed image data can then be displayed or recorded to the recording medium D depending on a control of the system control circuit 40 or computer 50.

Figure 12:
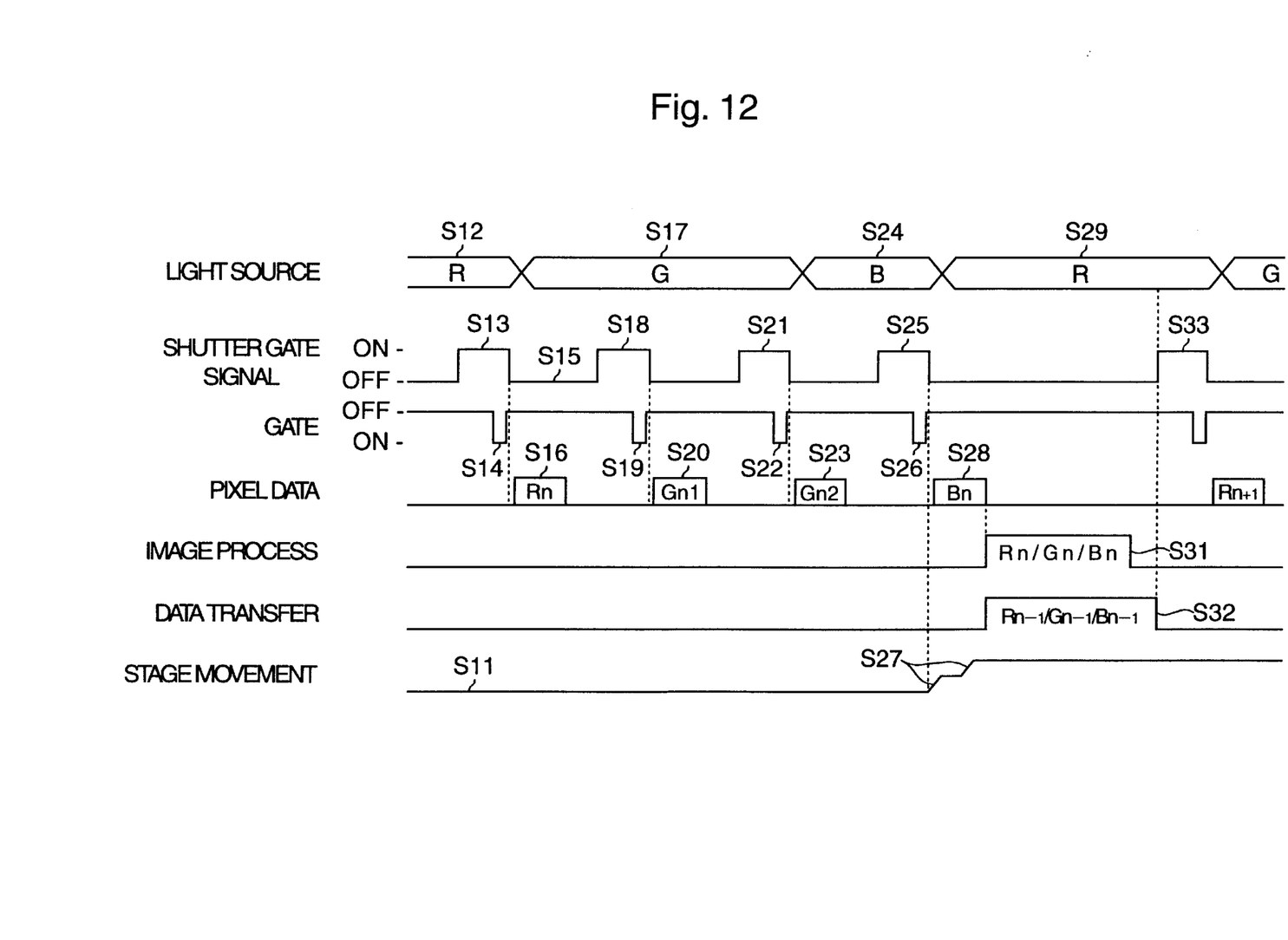
FIG. 12 is a timing chart showing an image reading operation when a number of exposures are set.

With reference to FIGS. 9 and 12, the "NUMBER OF EXPOSURES" operating condition is described.

A number of exposures is set by setting a number in the boxes B3, B4 and B5 indicated under the "NUMBER OF EXPOSURES" heading on the surface of the display device. Numbers indicated in the boxes B3, B4 and B5 imply the number of exposures required for red, green and blue components of the image to be read, respectively. Namely, when pixel data of one line of the same color component is read by the line sensor 30, a plurality of exposures is possible. For example, when "1", "2" and "1" are set in the boxes B3, B4 and B5, respectively, one exposure is carried out for reading the red component and the blue component, and two exposures are carried out for reading green component.

The numbers set in the boxes B3, B4 and B5 are decided by operating a mouse. Namely, by clicking the inside of the frame T3, an up-down-menu T4 is indicated beside the frame T3, and then by clicking the inside of the box B3, B4 or B5 that should be changed, the number can be changed by clicking an appropriate triangular mark shown in the up-down-menu T4.

FIG. 12 is a timing chart showing an example of an image reading operation when the "NUMBER OF EXPOSURES" operating condition has been set to "1", "2" and "1" in the boxes B3, B4 and B5, respectively. Namely, the numbers of exposures regarding reading of red, green and blue image data are 1, 2 and 1, respectively.

In a state in which the stage 12 is stopped (reference S11), the light-emitting diode 21R is turned ON so that a red light beam is emitted onto the read object M (reference S12). In this state, a shutter gate signal is changed from an OFF-state to an ON-state (reference S13), and thus an electric charge accumulation is started in the line sensor 30. Namely, red pixel data of one line is generated in the line sensor 30. When the exposure time for the red component is completed passed, a read-out gate signal is temporarily changed to an ON-state (reference S14), and then, after the electric charges are transferred to a transfer passage provided in the line sensor 30, the shutter gate signal is turned OFF (reference S15). After that, the red pixel data Rn of the one line are read from the line senor 30 (reference S16).

During the reading of the red pixel Rn, the light-emitting diode 21R is turned OFF and the light-emitting diode 21G is turned ON (reference S17). Then, in the same way as the reading of the red pixel data Rn, the shutter gate signal is set to an ON-state for a predetermined period (reference S18), so that green pixel data of the one line are generated in the line sensor 30. When the exposure time for the green component is completed, the read-out gate signal is changed to an ON-state (reference S19), and then the green pixel data Gn1 of the one line are read from the line sensor 30 (reference S20).

When the reading operation of the green component has been completed, the shutter gate signal is set to an ON-state for a predetermined period (reference S21), and green pixel data of the same one line are again generated in the line sensor 30. When the exposure time for the green component is completed, the read-out gate signal is changed to an ON-state (reference S22), and then the green pixel data Gn2 of the same one line are read from the line sensor 30 (reference S23). Namely, green component image data of the one line at the same position of the read object M are successively read twice.

During the reading of the green pixel data Gn2 (reference S23), the light-emitting diode 21G is turned OFF and the light-emitting diode 21B is turned ON (reference S24). Then, in the same way as the red and green pixel data, the shutter gate signal is set to an ON-state for a predetermined period (reference S25), so that blue pixel data of the one line are generated in the line sensor 30. When the exposure time for the blue component is completed, the read-out gate signal is changed to an ON-state (reference S26). After the electric charges are transferred to the transfer passage provided in the line sensor 30, the stage 12 is moved by an amount corresponding to two pulse signals to be positioned at the next reading position (reference S27), and the blue pixel data of the one line are read from the line sensor 30 (reference S28). During the reading of the blue pixel data, the light-emitting diode 21B is turned OFF and the light-emitting diode 21R is turned ON (reference S29).

Thus, regarding one line image included in an image recorded in the read object M, the red, green and blue pixel data are read, and the read pixel data are subjected to a shading correction in the image processing circuit 45 and stored in the memory 46. In the memory 46, each one line of the red and blue pixel data are stored in separate addresses. Conversely, the two one-lines of green pixel data are added to each other, and an average value is obtained for each of the pixels. The averaged green pixel data of the one line is then stored in an address of the memory 46.

In the image process circuit 45, image processes, such as a color correction and a gamma correction, are carried out to red, green and blue pixel data of an (n)th line, which has just been read (reference S31). During the image processing, the pixel data of an (n−1)th line, in which the image processes have been completed, are transferred to the computer 50 (reference S32).

When the transfer of the pixel data of the (n−1)th line has been completed, a reading operation of pixel data of an (n+1)th line is started (reference S33). Such reading operations are carried out by the number of lines to be read (approximately 1000 lines, for example), and thus the pixel data of one frame image are outputted to the computer 50.

In regard to changing a date and a time. This operation is performed by changing the numbers indicated in the menu image of the detail setting shown in FIG. 9. With respect to the date, a year, a month and a day are indicated in boxes B6, B7 and B8, respectively. With respect to the time, an hour, a minute and a second are indicted in boxes B9, B10 and B11, respectively. These numbers can be changed by clicking on the appropriate box (B6, B7, B8, B9, B10 or B11) inside the frame T3, and then clicking the decrement or increment triangular mark in the up-down menu T4, in a similar way to the setting of the "NUMBER OF EXPOSURES" operation condition.

As described above, in the embodiment, the operating conditions, such as the resolution, the thinning rate, the interpolation mode, the number of exposures, the date and time, are only changed by the computer 50, and cannot be changed by the image reading device. Thus, whether the image data is to be recorded to the recording medium D, or indicated on a display device of the computer 50, the reading, recording and deleting operations are always performed in accordance with the operating conditions preset from the computer 50. Due to this, the number of items, which need be set from the image reading device, are drastically reduced, so that a manipulation of an operation member, such as a switch, when in the stand-alone mode becomes simple and straightforward.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-364738 (filed on Dec. 22, 1997) which is expressly incorporated herein, by reference, in its entirety.

What is claimed is:

1. An image reading system having an operation mode which operates in accordance with an operating condition, said image reading system comprising:
an image reading device that performs a reading operation by which an image recorded in a read object is read;
a control circuit, disposed in said image reading device, that controls said image reading device in accordance with said operating condition; and
a connectable device connectable to said image reading device, said operating condition being settable by said connectable device, wherein said image reading device performs said reading operation in a remote mode in which said connectable device is connected to said image reading device, and a stand-alone mode in which said connectable device is detached from said image reading device, and wherein a number of operating conditions changeable in said remote mode is greater than a number of operating conditions changeable in said stand-alone mode.

2. A device according to claim 1, wherein said connectable device comprises a computer.

3. A device according to claim 1, wherein said operating condition is settable only when said connectable device is connected to said image reading device.

4. A device according to claim 1, wherein said connectable device controls said reading operation through said control circuit in said remote mode, and said control circuit operates in said remote mode and said stand-alone mode to control said reading operation.

5. A device according to claim 1, wherein said image reading device comprises a memory, and data corresponding to said operating condition is stored in said memory.

6. A device according to claim 1, wherein said operating condition includes a thinning of image data obtained by said reading operation.

7. A device according to claim 1, wherein said operating condition includes an interpolation of image data obtained by said reading operation.

8. A device according to claim 1, wherein said image reading device comprises a light source that selectively emits one of red, green and blue light beams onto said read object, and said operating condition includes a color image sensing operation that controls said light source such that said red, green and blue light beams operate for a predetermined number of emissions, respectively, to sense red, green and blue image data corresponding to said image.

9. A device according to claim 1, wherein said operating condition includes a predetermined resolution with which said image is indicated on a display device.

10. A device according to claim 1, wherein said operating condition includes a predetermined resolution with which image data, obtained by said reading operation, is recorded in a recording medium.

11. A device according to claim 1, wherein said operating condition includes a date and a time that said reading operation is performed.

12. A device according to claim 1, wherein said operation mode comprises at least one of said reading operation, a recording operation in which image data, obtained by said reading operation, is recorded to a recording medium, and a deleting operation in which said image data, recorded in said recording medium, is deleted.

13. An image reading device attachable to a connectable device, said image reading device performing a reading operation in which an image, recorded in a read object, is read, and a recording operation in which image data corresponding to said image is recorded to a recording medium, said reading and recording operations being performable independently of said connectable device, said image reading device comprising:

a connecting terminal to which said connectable device is connected, so that data is transmittable between said image reading device and said connectable device;

a memory that stores operation condition data, which is used in said reading and recording operations; and a control processor that controls said reading and recording operations in accordance with said operation condition data, and stores said operation condition data when said operation condition data is inputted from said connectable device through said connecting terminal, wherein said reading operation and said recording operation of said image reading device is operable in a stand-alone mode in which the connectable device is detached from said image reading device, and a remote mode in which the connectable device is connected to said image reading device, and wherein a number of changeable operating conditions in said remote mode is greater than a number of changeable-operating conditions in said stand-alone mode.

* * * * *